United States Patent [19]

Kitagawa

[11] Patent Number: 5,024,561
[45] Date of Patent: Jun. 18, 1991

[54] BULK MATERIAL FEEDER PROVIDED WITH INTERNAL CLEANING MECHANISM

[76] Inventor: Isao Kitagawa, 110-4, Kamiwada-machi, Takasaki-shi, Gunma-ken, Japan

[21] Appl. No.: 356,693

[22] Filed: May 25, 1989

[30] Foreign Application Priority Data

Oct. 4, 1988 [JP] Japan .............................. 63-129606[U]

[51] Int. Cl.⁵ ............................................... B65G 53/60
[52] U.S. Cl. ..................................... 406/173; 406/168; 406/163
[58] Field of Search .............. 406/163, 168, 173, 146, 406/157; 414/291; 222/148; 15/300 R, 301, 405, 406; 134/172, 175, 177, 182, 184, 183, 195, 198, 199

[56] References Cited

U.S. PATENT DOCUMENTS 2,153,026  4/1939  Ringius .......................... 406/168 X
3,885,606  5/1975  Krauss ............................ 406/168 X

FOREIGN PATENT DOCUMENTS 3327461  2/1985  Fed. Rep. of Germany ...... 406/173

Primary Examiner—Margaret A. Focarino
Assistant Examiner—James M. Kannofsky
Attorney, Agent, or Firm—Fleit, Jacobson, Cohn, Price, Holman & Stern

[57] ABSTRACT

The bulk material feeder of the present invention, because of the need for cleaning the inside of the feeder, jets out pressurized clean air into the equipment. The air is supplied through the piping used to supply resin pellets and nozzle to carry out the cleaning action, utilizing turbulent flow generated when the air current jetted out collides with baffles installed in the equipment. The air and pellets are easily aspirated and cleans fines adhered to internal walls of the hopper since, naturally, resin pellets remaining in the equipment are destroyed by the turbulent flow. Also resin pellets are destroyed a little by the impact when colliding with internal walls of the hopper, and due to other causes. Residual pellets aspired to the outside and fines adhered to the inside are collected, and internal cleaning can be accomplished in an extremely short time. A bulk material feeder is thus provided with an internal cleaning mechanism.

3 Claims, 5 Drawing Sheets

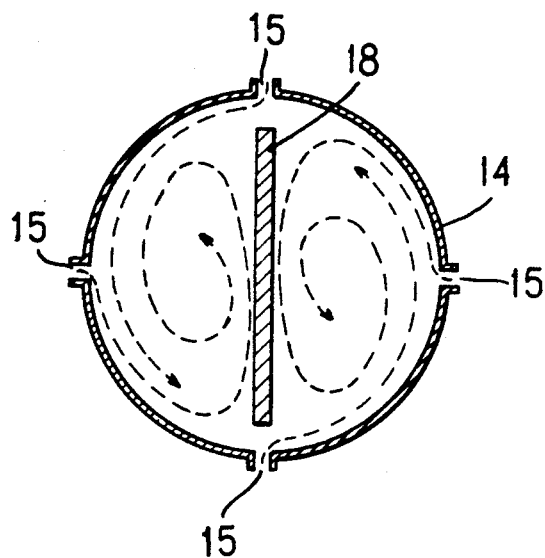
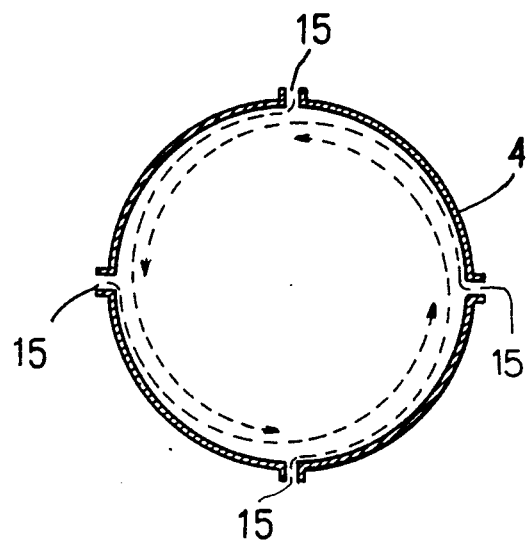
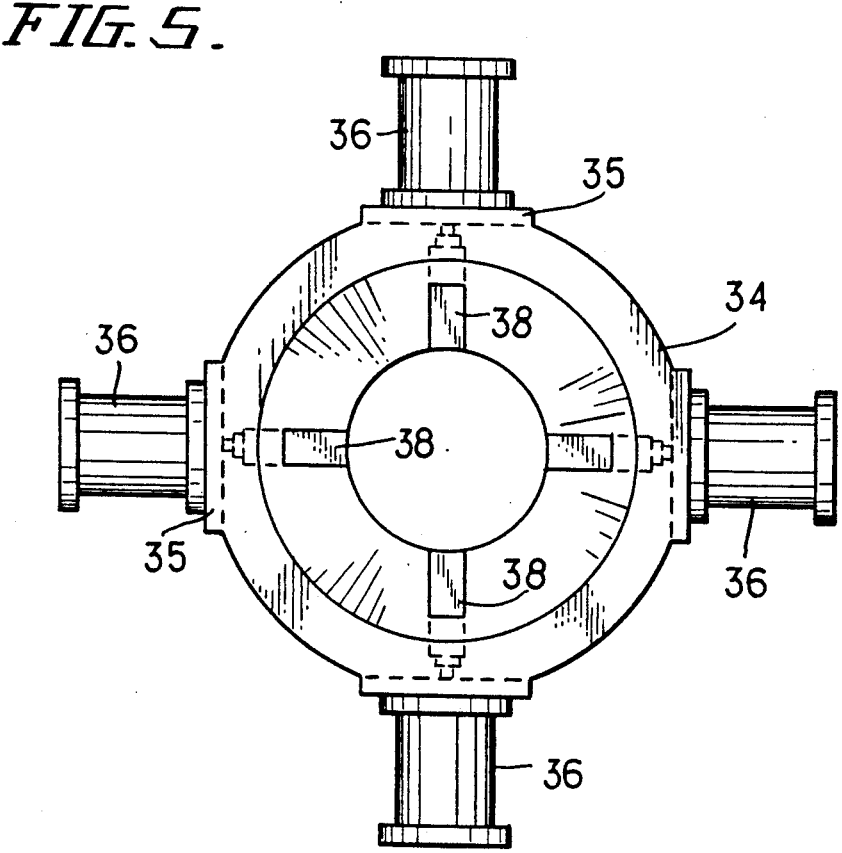

BULK MATERIAL FEEDER PROVIDED WITH INTERNAL CLEANING MECHANISM

BACKGROUND OF THE INVENTION

The present invention relates to a bulk material feeder constituted such that, in particular, a cleaning mechanism of a loader inside is provided inside the feeder. The invention is related to a bulk material feeder (in general referred to as loader) used to supply plastic materials for molding, in an adequate quantity, to a plastic molding machine.

In carrying out the plastic molding, it is widely known to employ a bulk material feeder, called, in general, a loader, as a unit to feed materials for molding to a molding machine.

The above-mentioned bulk material feeder is known to be public and is combined with a plastic molding machine, concretely, as exemplified in FIG. 9.

Such units are constituted by an aspirator, composed of a filter 1 and a blower 2, a molding machine 3 and a material hopper 4, a target tube section 5, a bulk material quantity detection sensor 6, a cyclone separator 7 and, a material tank 8, etc., as a bulk material feeder.

The filter 1 and the cyclone separation 7 of the above-mentioned aspirator are linked by a suction pipe 11, and the cyclon 7 and the material tank 8 are linked by a transportation piping 12.

The above-mentioned equipment operates as follows:

First, negative pressure is formed in the section of the cyclon 7 through the section pipe 11 by driving the blower 2 installed in the aspirator.

Resin pellets 9 as plastic material are aspired and transported, together with the air, through the transportation piping 12, and reaches the section of the cyclone separator 7.

Resin pellets 9 are aspired from the material tank 8 together with the air, since they have proper weight. The pellets are separated from the air in the cyclone separator 7, dropped, stored in the material hopper 4 on the molding machine 3 through the target tube section 5, and continuously fed to the molding machine in the required quantity.

The supply quantity control of resin pellets 9 is carried out by supervising the resin pellet quantity in the target tube section 5 with the sensor 6. Part of the raw pellets used is micronized by an impact at the time of supply, or for other reasons. This part of the raw pellets adheres to internal walls of the hopper, resulting in not easily attaining the object of changing of resin materials used by only supplying and transporting new resin material pellets.

As a means to cope with these problems, conventionally, as exemplified in FIGS. 9 and 10, many operations to dismantle the section of the hopper 4, where fines of raw materials adhered to internal walls of the hopper, are required, and, using an air gun 10, fines of resin adhered must be blown off by blowing pressurized air on the hopper walls or the surface coated with raw resin must be wiped off and cleaned manually.

In case such a measure is taken, however, in a large-sized molding machine, the dismantling and cleaning work required for the equipment is not easy.

In particular, in terms of the equipment construction, there are many places where scaffolding is not good, and so on, and a long time is also required for the cleaning work. Also, during cleaning work, the molding work must be stopped. Further, effective cleaning is not often able to be expected.

Besides, in case the pressurized air is jetted out so as to produce an excessively strong air current, causing strong pressure, static electricity is generated inside the hopper. Moreover, there are also difficult points because of the adhesion of fines to the inside of the hopper, and so on, and there is a limit also in the rise of air pressure.

SUMMARY OF THE INVENTION

The object of the present invention is to solve defects the conventional techniques have, and to offer a bulk material feeder incorporating an internal cleaning mechanism, enabling one to easily attain cleanliness of internal walls of the hopper in the bulk material feeder.

The present invention has, as its main point the object of providing an improved feeder of bulk materials provided with at least a nozzle to jet out air for pressurized cleaning toward the inside of a vessel to supply molding materials to the molding machine. An air current is formed in the vessel, and inside of the vessel, an internal cleaning mechanism is provided. Installed baffles produce turbulent air, or vortex flow and are located in positions which exert an influence upon the air current the above-mentioned nozzle jets out.

BRIEF DESCRIPTION OF THE DRAWINGS

FIG. 3 and FIG. 4 show the state of air current inside the hopper;

FIG. 5 is a plan view of a hopper section, showing a different embodiment from that shown in FIG. 1-4;

DETAILED DESCRIPTION OF THE PREFERRED EMBODIMENTS

Figure 1:
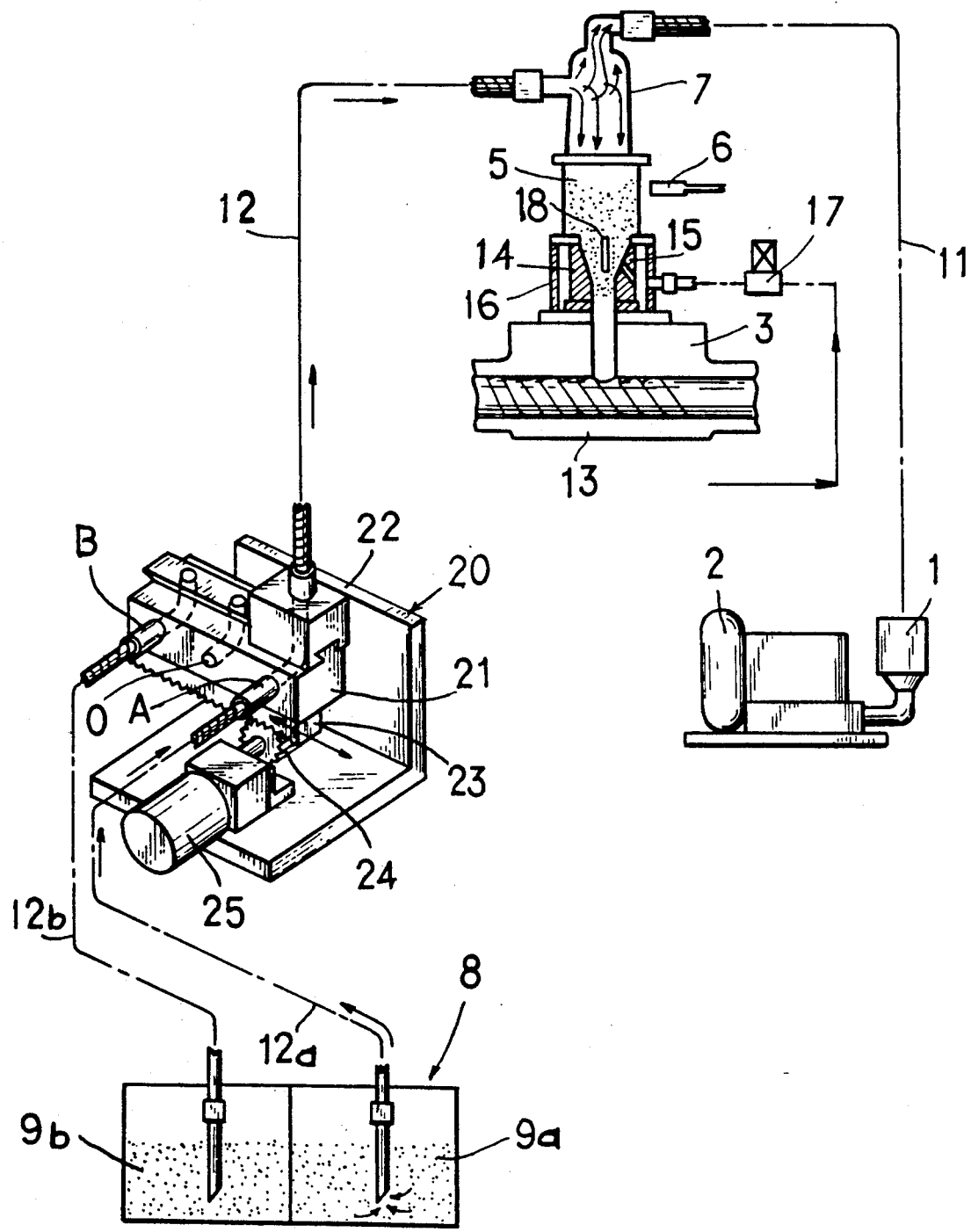
FIG. 1 is a drawing indicating the arrangement of a bulk material feeder provided with an internal cleaning mechanism related to present invention, showing how the material resin is fed and operated.

FIG. 1 shows one embodiment of the bulk material feeder according to the present invention for a plastic molding machine.

The aspirator employed in the present invention is constituted by a blower 2 provided with a filter 1. Reference numeral 3 denotes a molding machine, inside of which an extrusion screw 13 is disposed.

Reference numeral 5 denotes a target tube, designed so that the material supply state and quantity can be confirmed by a sensor 6.

The spacing between the aspirator and the cyclone separator 7 is traversed by a section of pipe 11 which connects the aspirator and cyclone separator.

Reference numeral 14 denotes a material hopper. On wall surfaces of the hopper 14, an adequate quantity of nozzles 15 is formed to jet out air from the outside to the inside of the vessel.

The periphery of this material hopper 14 is hermetically surrounded by outer rings 16. The inside of these outer rings is constituted so that the pressurized air can be freely supplied through a solenoid valve 17 from a compressor (not illustrated).

Further, inside of the material hopper 14, baffles 18 are disposed in positions where the air current jets out from each of the nozzles 15.

Due to the fact that the above-mentioned baffles 18 exist, the air current jetted out from each of the nozzles 15 collides with these baffles to form turbulent flow. Air cleaning of the inside of the material hopper 14 is surely carried out by the thus formed turbulent flow.

In this connection, the above-mentioned baffles 18 can be fixed inside the material hopper 14, and formed so that they can come and go freely from the outside of the hopper 14 toward the inside as required, being of movable construction as described later on.

Further, in the transportation piping 12, connected between the cyclone separator 7 and the material tank 8, a supply material switching unit 20 is disposed.

The material tank 8 is formed by at least two tanks, and is designed so that resin materials of different kinds, colors, etc., that is to say, resin pellets 9a and 9b can be selected.

Incidentally, it is also possible to make this material tank 8 a mobile type, and replace it as required.

The supply material switching unit 20 may be constituted by a slide manifold 21 to which transportation piping 12a and 12b from the material tank 8 are connected, respectively. A suction head 22 connects with this slide manifold 21, and rack and pinion 23 and 24 move selectively the slide manifold 21 in the horizontal direction by means of a drive motor 25.

It is enough that the slide manifold 21 and the suction head 22 have a relative movement therebetween. Therefore, the construction shown in the illustrated embodiment could be modified so that the suction head 22 may be moved.

Further, it may be clear that many changes are possible also for the switching drive mechanism.

The switching operation of the supply material switching unit 20 illustrated is carried out as follows:

In case the unit is switched from a state in which resin pellets 9a are supplied, as illustrated in FIG. 1 to a state in which resin pellets 9b, the slide manifold 21 is moved by the drive motor 25. The suction head 22, matching with the position A corresponding to the transportation piping 12a, is switched to position O, which is an intermediate position shown in FIG. 2.

While the suction head is in the position O, cleaning work inside the feeder is carried out as described later on.

After ending the cleaning work, the slide manifold 21 is moved again by the drive motor 25, and the suction head 22 is switched to the position B, corresponding to the transportation piping 12b.

By such a constitution, in switching the position of the suction head 22 from the position A to the position B, or in the opposite direction, if the suction head 22 is controlled to stop once in the position O, the cleaning work can be effectively carried out.

Figure 2:
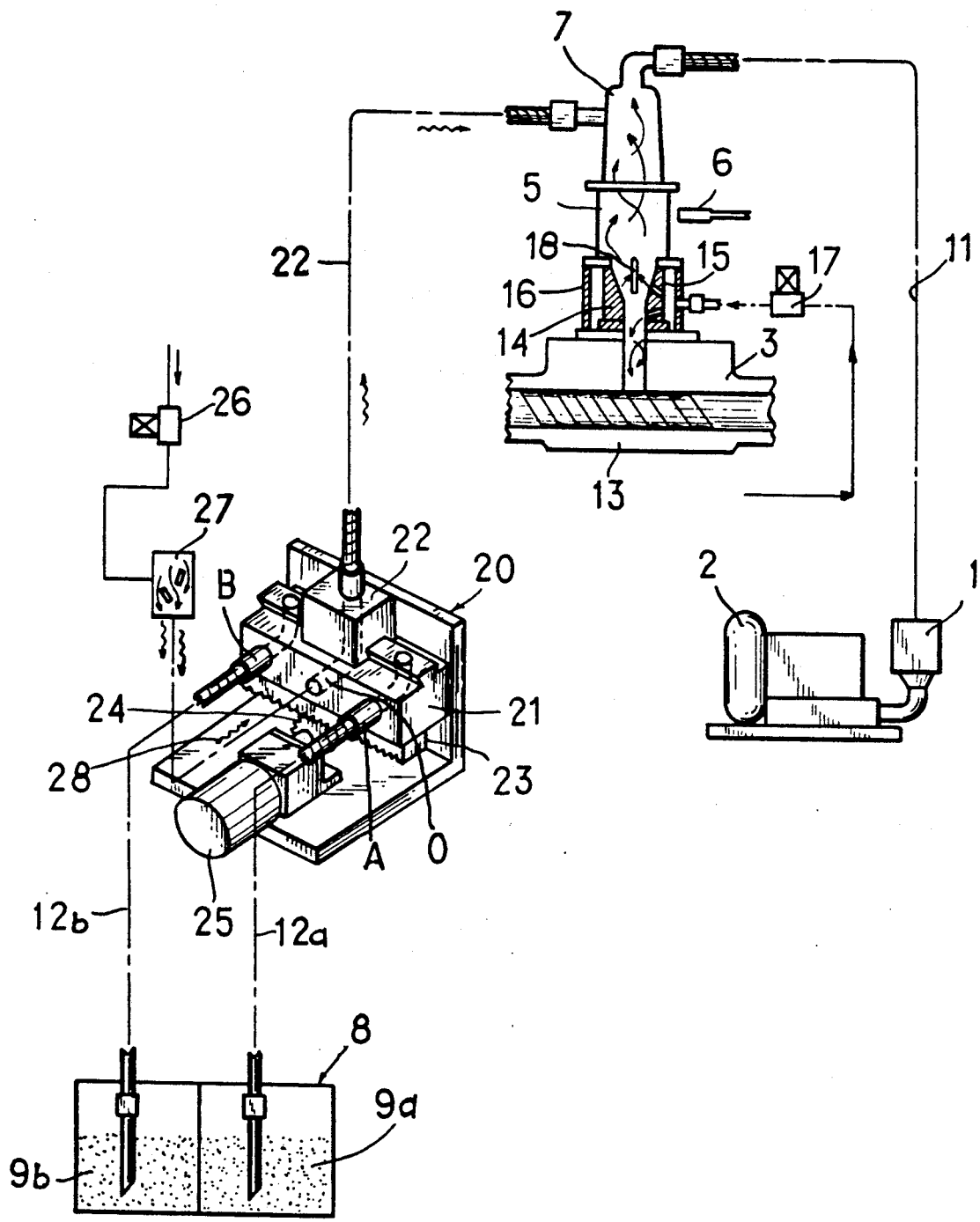
FIG. 2 is a drawing showing the material resin supply as being stopped.

In this connection, in the state exemplified in FIG. 2, though the position O is constituted as the opened state for enabling free aspiration of the open air, these mechanisms can also be constituted to perform the air cleaning more favorably, including also air cleaning of the inside of a transportation piping 12, by introducing the pressurized air current to positively form the turbulent flow by using a compressor 26 and a turbulent flow generator 27 at the time of internal cleaning.

Hereinafter, the operation of the cleaner related to the present invention will be explained.

For the supply material switching unit 20, the suction head 22 stops in the position O of the slide manifold 21, as exemplified in FIG. 2, by the drive of the drive motor 25.

In this state, the compressor 26 and the turbulent flow generator 27 are driven, and the pressurized air forming the turbulent flow is supplied and transported through the transportation piping 12.

On one side, the solenoid valve 17 is opened, blowing in the pressurized air from the compressor (not illustrated) into the outer ring 16, and the blower 2 of the aspirator is driven. The pressurized air forcefully blown in and passed through the injection nozzle 15 rises, turning upward (since the lower face direction of the hopper is blocked by molding devices), and aspired to the aspirator side.

The pressurized air jetted out collides with baffles inside of the feeder, so that turbulent flow is formed, and each section of the inner wall is forcedly cleaned.

In the construction as exemplified in FIG. 3, where baffles 18 exist inside the hopper as in the present invention, turbulent flow is easily formed, and the cleaning of internal walls can be effected.

In a case in which baffles are not installed, as exemplified in FIG. 4, even if the nozzle direction, layout position, air pressure to supply, etc. are changed in any way, the air supplied inside becomes almost a rectified positive current, and sufficient cleaning, therefore, cannot be obtained.

Figure 6:
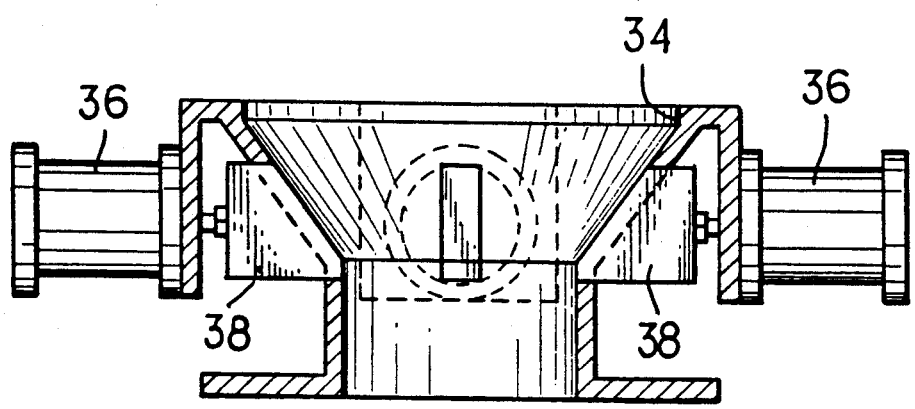
FIG. 6 is a side view of FIG. 5.

FIGS. 5 and 6 are a plan view and a side view, respectively, showing the essential parts of another embodiment of the present invention. In this embodiment, four corners of a material hopper 34, cylinder brackets 35 and cylinders 36 are disposed. At the tip of each cylinder rod, a baffle 38 of a mobile type are connected.

The above-mentioned baffles 38 are located outwards of the hopper 34 in the material supply mode, and, in the internal cleaning mode, they are inserted into the inside of the hopper, according to the extension operation of the cylinders 36.

In this case, insertion of all four baffles, one to two baffles, or partial insertion of the overall length of baffles 38, and so one, can be opportunely selected according to the cleaning conditions. Further, accompanying front and rear movement of the baffles (i.e., appearance and disappearance of the baffles inside of the hopper), the air cleaning work can be carried out also.

As the result, without hindering the material supply work, it is possible to adopt a construction enabling the optimum turbulent flow generation effect in the cleaning work. In this connection, the illustration of injection nozzle for pressure air introduction was omitted.

Figure 7:
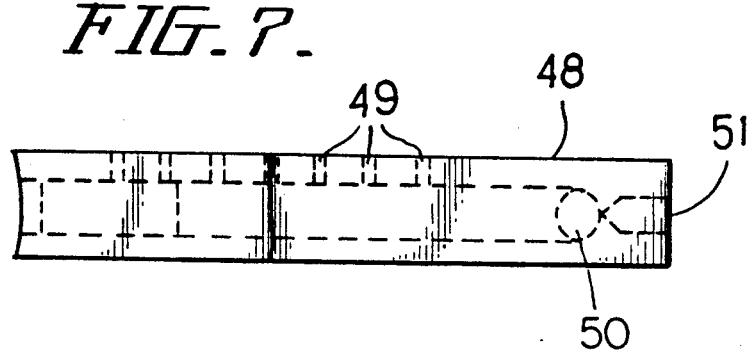
FIG. 7 is a plan view of another embodiment to show a different structure added to the baffles.
Figure 8:
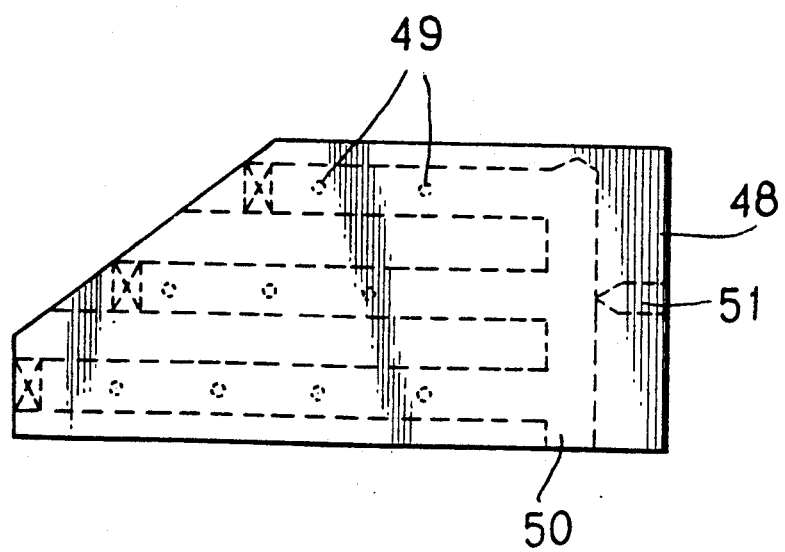
FIG. 8 is a side view of FIG. 7.
Figure 9:
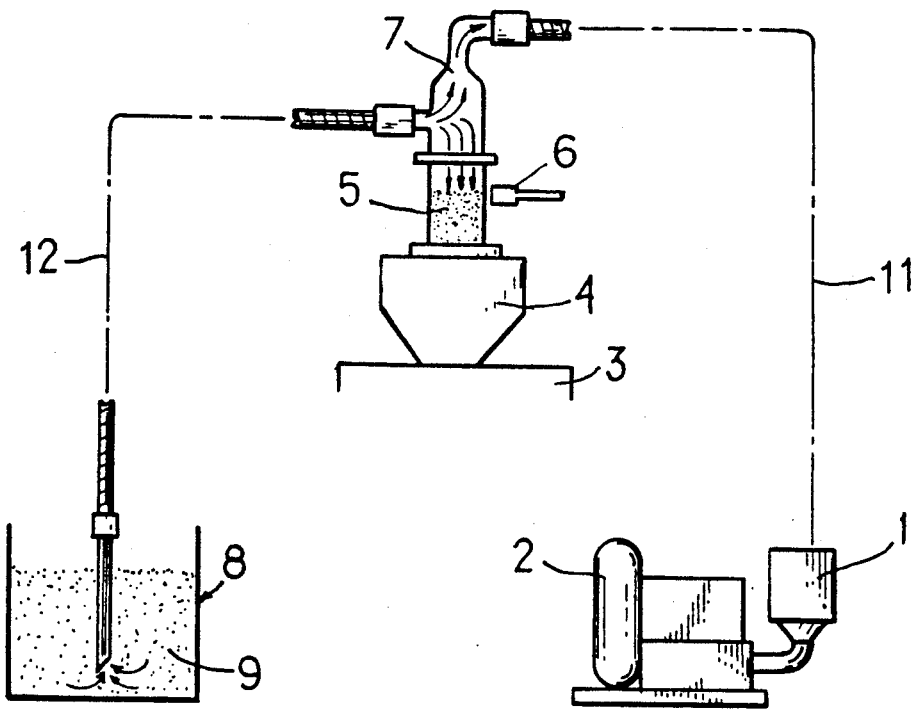
FIG. 9 is a drawing showing an example of the material feeder in accordance with a conventional technique.
Figure 10:
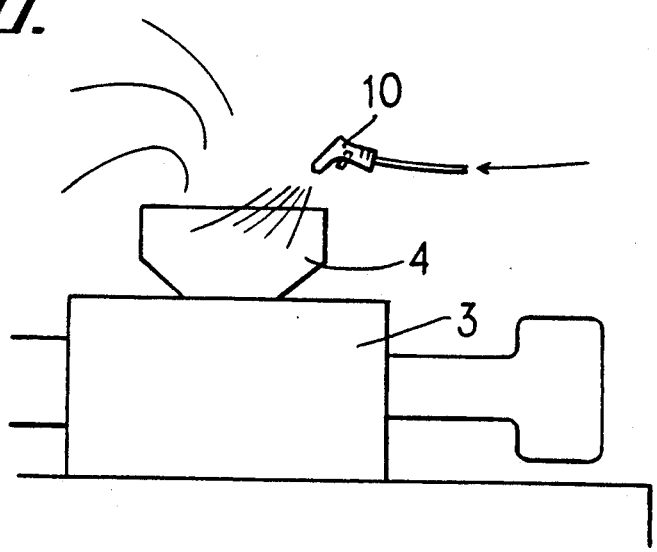
FIG. 10 is a drawing of air cleaning work inside the vessel of the material feeder in accordance with the conventional technique.

FIG. 7 and FIG. 8 show a different embodiment of the present invention, changes the construction of baffles of a mobile type, exemplified in FIGS. 5 and 6, have been changed to baffles 48 of different construction.

In this construction, injection nozzles 49 for pressurized air are formed in baffles 48 themselves, and by this, the design generates sufficient turbulent flow inside the hopper.

Inside baffles 48, communicating holes, indicated by broken lines formed, are in such a way that the pressurized air supplied to an air inlet 50 is jetted out from nozzles 49. Further, an inclination section, formed at the tip of the baffle 48, has a form matching internal walls of the hopper, and in the middle of other end of the baffle, a mounting hole 51 of the cylinder rod is formed. According to this embodiment, in forming injection nozzles for pressurized air, the degree of freedom for the design is increased, and the advantageous turbulent flow generation effect can be expected to be more than the simple baffle.

Likewise, in this case, by using such a construction accompanying the front and rear movement of the baffles (i.e., appearance and disappearance of the baffles inside of the hopper), or partial insertion of them, and so on, a large turbulent flow generation effect can be obtained.

According to the present invention, when the need to clean the equipment inside to supply the raw resin is present, the troublesome line work of dismantling the equipment and cleaning work required to wipe the dismantled equipment by man power is unnecessary, and the work stoppage time accompanied by the change of supply materials can be sharply reduced.

Further, bad influences, etc., on the peripheral area, caused by scattering fines of resin materials caused when the equipment is dismantled, and so on, can be eliminated. Proper cleanliness can be attained eliminating defects in conventional equipment.

In this connection, the present invention is not limited to a plastic molding machine using bulk materials as in the described embodiment. It is also possible to apply the invention to other bulk material processing equipment, like food processors, pharmaceutical equipment, etc. causing powder mixed bulk materials as raw materials.

What is claimed is:

1. A bulk material feeder provided with an internal cleaning mechanism, comprising:
    means for jetting out pressurized air for cleaning toward an inside of a vessel to supply molding materials to a molding machine,
    at least one nozzle provided to form an air current from the pressurized air in the vessel, and
    baffles installed so as to exert an influence upon the air current formed by the at least one nozzle inside the vessel, the baffles being movable so as to appear by moving outside and disappear by moving inside the vessel as required.

2. A bulk material feeder as defined in claim 1, wherein each baffle is formed with an inclined section at a tip thereof substantially matching internal walls of the vessel.

3. A bulk material feeder as defined in claim 1, wherein at least one nozzle is formed on each baffle.

* * * * *